United States Patent
Ueno

[11] Patent Number: 5,928,779
[45] Date of Patent: Jul. 27, 1999

[54] RESIN COAT PIECE FOR BEARING CONTAINING A MIXTURE OF MINERAL FILLER AND ELASTOMERIC POWDER

[75] Inventor: Hiroshi Ueno, Tondabayashi, Japan

[73] Assignee: Koyo Seiko Co., Ltd., Osaka, Japan

[21] Appl. No.: 08/866,155

[22] Filed: May 30, 1997

[30] Foreign Application Priority Data

May 30, 1996 [JP] Japan ................................ 8-136393

[51] Int. Cl.$^6$ ...................................................... B32B 5/16
[52] U.S. Cl. ..................... 428/327; 428/330; 428/477.7
[58] Field of Search .................................. 428/327, 323, 428/330, 474.4, 477.7, 475.5

[56] References Cited

FOREIGN PATENT DOCUMENTS

| 306903-A2 | 3/1989 | European Pat. Off. . |
| 583706-A1 | 2/1994 | European Pat. Off. . |
| 2-546895 | 6/1983 | France . |
| 56-131024 | 10/1981 | Japan . |
| 6-54131 | 9/1987 | Japan . |
| 09-012873 | 1/1997 | Japan . |

*Primary Examiner*—Hoa T. Le
*Attorney, Agent, or Firm*—Thelen Reid & Priest LLP

[57] ABSTRACT

A resin coat piece is provided in a bearing at a fitting surface with a housing or a shaft to eliminate occurrence of creep, and this resin coat piece is composed of a base material of polyamide 66 and mineral powder and an elastomer powder which are dispersedly mixed in the base material.

7 Claims, 2 Drawing Sheets

RESIN COAT PIECE FOR BEARING CONTAINING A MIXTURE OF MINERAL FILLER AND ELASTOMERIC POWDER

BACKGROUND OF THE INVENTION

1. Field of the Invention

The present invention relates to a resin coat piece provided in a bearing at a fitting surface with a housing to prevent occurrence of creep.

2. Description of the Prior Art

In case where a steel bearing is incorporated in a housing which has a great thermal expansion coefficient such as formed of an aluminum alloy, when the ambient temperature rises, an interference between fitting portions of an outer ring of the bearing and of the housing decreases due to a difference in the thermal expansion coefficients of the both. This results in the occurrence of so-called creep wherein the outer ring of the bearing turns relative to the housing.

To prevent the occurrence of such creep, the conventional arrangement is made such that a resin coat piece formed of a resin material is attached to the bearing with its fitting surface to the housing being continuously extended along the circumference of the bearing. In this arrangement, the frictional resistance of the resin coat piece is effective to prevent the bearing from turning relative to the housing even when the interference between the fitting portions decreases.

Examples of a usable resin material for forming the resin coat piece include polyamide 66 (PA66), polyamide 11 (PA11), polybutylene terephthalate (PBT) and the like.

The aforementioned resin materials (PA66, PA11, PBT) used for the conventional resin coat piece have properties as shown in the following Table 1. Based on these properties, each of the resin materials is evaluated as shown in Table 2. Incidentally, the circle in the Table 2 denotes "excellent", whereas the triangle denotes "relatively inferior".

As appreciated from Table 2, however, the resin materials have respective problems although they fully serve the purpose of preventing the creep. More specifically, PA66 has a great dimensional change due to water absorption. PA11 is incapable of withstanding continuous use for a long term at a temperature above 150° C., for example. Furthermore, PA11 is more expensive and less versatile in general as compared with PBT and PA66. PBT, in turn, is incapable of withstanding continuous use for a long term at a temperature above 150° C., for example.

TABLE 1

| | Resin types | | |
|---|---|---|---|
| Properties | PA66 | PA11 | PBT |
| Specific gravity | 1.13 | 1.04 | 1.31 |
| Water absorption [%] | 8.5 | 2.5 | 0.4 |
| Tensile strength [Mpa] | 83 | 56 | 52 |
| Flexural strength [Mpa] | 118 | 66 | 93 |
| Fusion point [° C.] | 260 | 187 | 225 |
| Thermal deformation temperature [° C.] At load of 0.46 Mpa | 230 8.1 | 154 15 | 154 10 |
| Thermal expansion coefficient [$10^{-5}$/° C.] | | | |
| Cost ratio (based on PA66 as 1) | 1 | 3.2 | 1.3 |

TABLE 2

| Evaluation item | Resin types | | |
|---|---|---|---|
| | PA66 | PA11 | PBT |
| Creep torque | ○ | ○ | ○ |
| Heat resistance | ○ | △ | △ |
| Dimensional stability | △ | ○ | ○ |
| Cost | ○ | △ | ○ |

OBJECT AND SUMMARY OF THE INVENTION

An object of the present invention is to provide a resin coat piece for bearing which is less costly and has an excellent performance for preventing the creep.

To achieve the above-mentioned object, the resin coat piece for bearing according to the present invention is provided in a bearing at a fitting surface with a member to be fitted such as a housing or a shaft, and the resin coat piece comprises:

a base material of polyamide 66; and mineral powder and elastomer powder which are dispersedly mixed in said base material.

Mixture of the mineral powder eliminates occurrence of shrinkage or warp from the resin coat piece during the injection molding. Mixture of the elastomer powder is effective to slow down the curing process of the resin material, thereby facilitating an even application of pressure to the entire resin material. Transfer from the mold is thereby precisely executed. In addition, the elastomer powder contributes to a reduced water absorption of the resin material. Furthermore, the elastomer powder can more than compensate for a thermal expansion coefficient reduced by the mixture of the mineral powder for eliminating shrinkage and warp, rather increasing the overall thermal expansion coefficient of the resin material. More specifically, polyamide 66 has such advantages as good heat resistance, reasonable price and general versatility but has a disadvantage of poor dimensional stability, in particular, which can be improved by the employment of the mineral powder and the elastomer powder. Thus, the invention provides the resin coat piece which is capable of withstanding continuous use for a long term under high temperature conditions, with a reliable effect of preventing the creep and reducing the dimensional change due to water absorption.

A preferable example of the mineral powder is calcium carbonate or mica. Also, a preferable example of the elastomer powder is a modified EPDM obtained by grafting maleic anhydride onto an ethylene-propylene-diene terpolymer or an ethylene-propylene copolymer (EPM).

A preferred particle size of the mineral powder is in the range of 1 to 3 μm, and a preferred particle size of the elastomer powder is in the range of 0.1 to 1 μm.

A mineral powder under 1 μm in particle size is hardly commercially available, resulting in higher costs. On the other hand, a mineral powder over 3 μm in particle size has a small thermal expansion coefficient, thereby reducing the effect for preventing the creep.

An elastomer powder under 0.1 μm in particle size is hardly commercially available, resulting in higher costs. On the other hand, an elastomer powder over 1 μm in particle size presents a poor dispersiveness and may spoil both the strength and the precision of molding.

A preferred mixing rate of the mineral powder is 5 to 15 wt %, and a preferred mixing rate of the elastomer powder is 10 to 20 wt %.

If a content of the mineral powder is under 5 wt %, the addition thereof does not provide a sufficient effect. If a content thereof exceeds 15 wt %, the resultant resin material is reduced in the thermal expansion coefficient, thus reduced in the effect of preventing the creep. If a content of the elastomer powder is under 10 wt %, the addition thereof does not provide a sufficient effect. If a content thereof exceeds 20 wt %, the resultant resin material is reduced in the roundness and the tensile strength.

DESCRIPTION OF THE PREFERRED EMBODIMENT

Hereafter, an embodiment of the present invention will be described with reference to the accompanying drawings.

Figure 1:
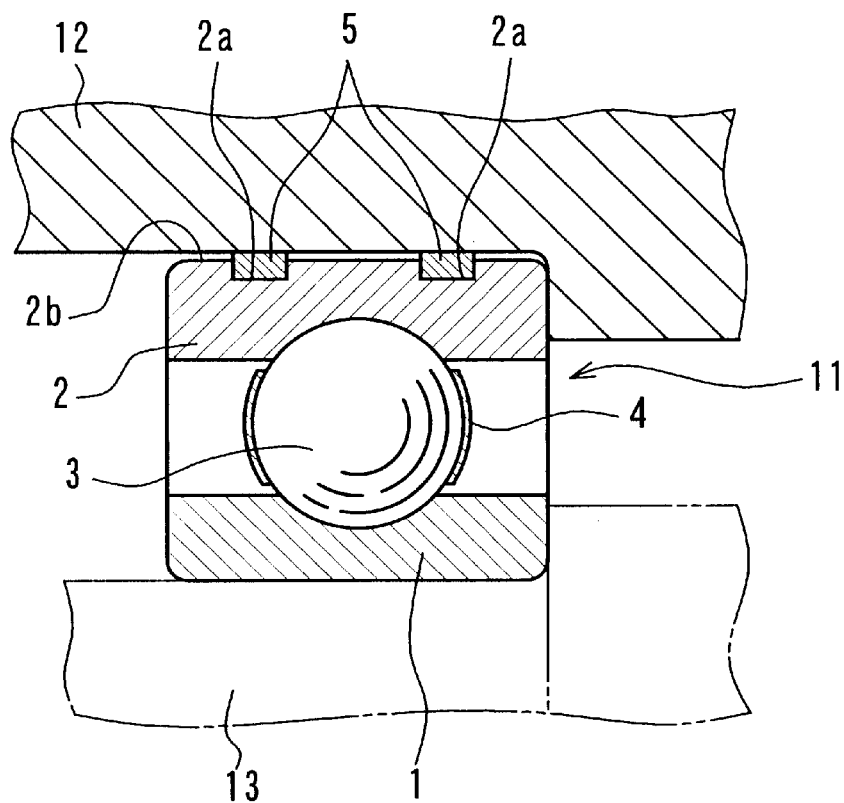
FIG. 1 is a principal sectional view showing a rolling bearing in which a resin coat piece according to an embodiment of the invention is used.
Figure 2:
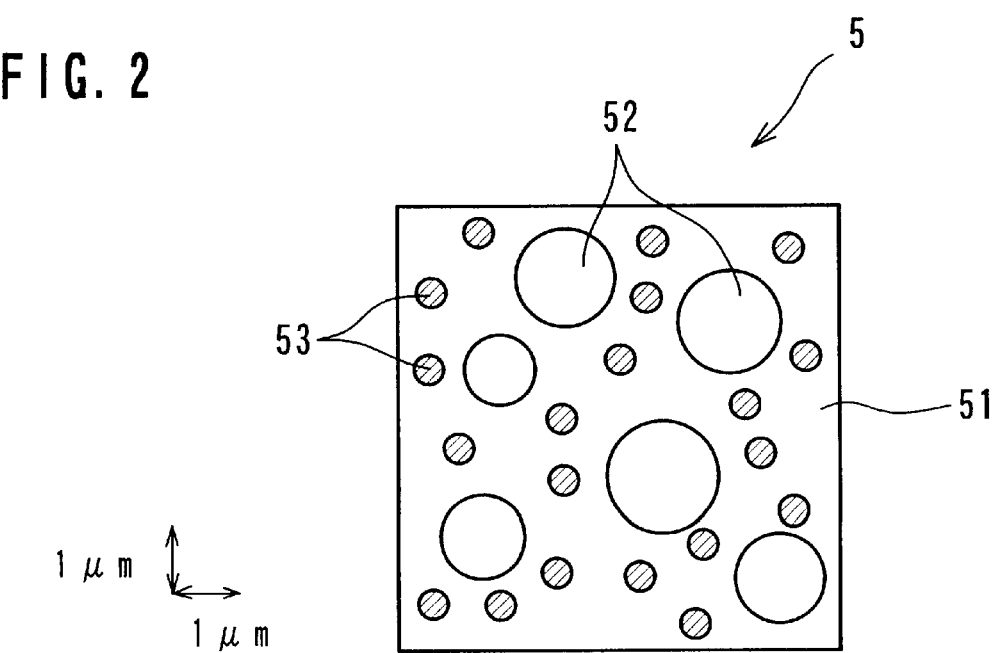
FIG. 2 is a schematic diagram showing the composition and configuration of the resin coat piece in FIG. 1.
Figure 3:
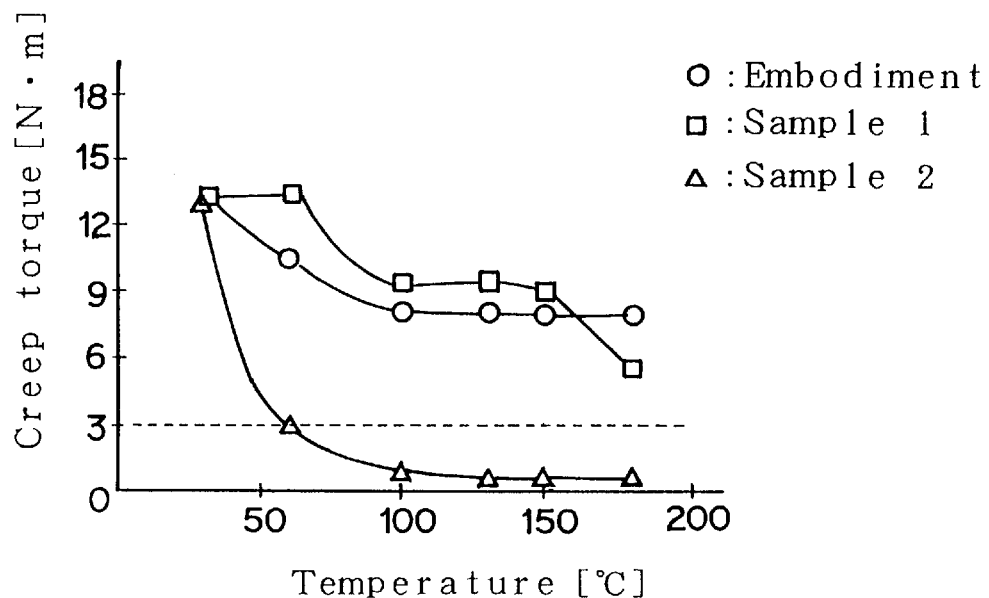
FIG. 3 is a graph of the relationship between the creep torque of the bearing and the ambient temperature.
Figure 4:
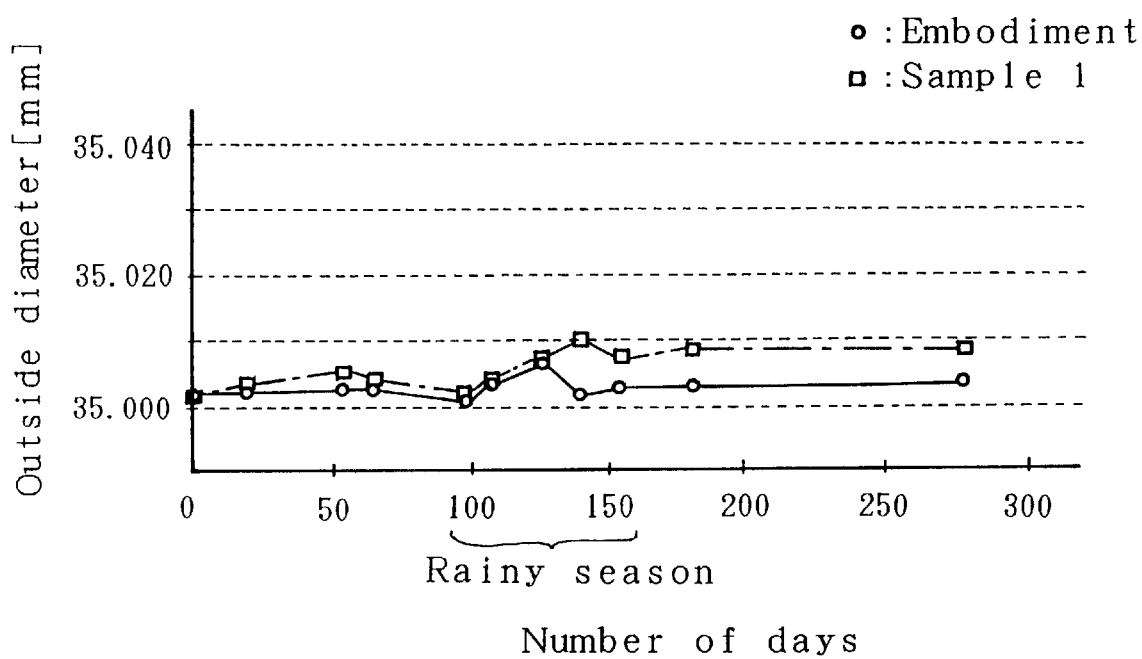
FIG. 4 is a graph of the relationship between the total number of days during which the resin coat piece was allowed to stand in a warehouse and the change in the outside diameter thereof.

FIG. 1 is a principal sectional view showing a rolling bearing in which a resin coat piece is used. FIG. 2 is a schematic diagram showing the composition and configuration of the resin coat piece. FIG. 3 is a graph of the relationship between a creep torque of the bearing and an ambient temperature. Further, FIG. 4 is a graph of the relationship between total number of days during which the resin coat piece was allowed to stand in a warehouse and the change in an outside diameter thereof.

Now referring to FIG. 1, a rolling bearing 11 rotatably holds a shaft 13 relative to a housing 12 which is formed of an aluminum alloy.

The rolling bearing 11 is composed of an inner ring 1, an outer ring 2, a rolling body 3, a retainer 4 and a resin coat piece 5. According to the embodiment hereof, an outer peripheral surface of the outer ring 2 is formed with two circumferentially continuous grooves 2a spaced from each other in the axial direction. The resin coat piece 5 is mounted in each of the grooves 2a. Each of the inner ring 1, the outer ring 2 and the rolling body 3 is formed of bearing steel (SUJ2), and the retainer 4 is formed of soft steel (SPCC).

As shown in FIG. 2, the resin coat piece 5 is composed of a base material 51 of polyamide 66 (PA66) and mineral powder 52 and elastomer powder 53 which are dispersedly mixed in the base material 51.

Calcium carbonate or mica is suitable as the mineral powder 52. Modified EPDM or EPM is suitable as the elastomer powder 53. The modified EPDM is obtained by grafting maleic anhydride onto an ethylene-propylene-diene terpolymer containing a small amount of diene which is referred to as a tertiary component such as dicyclopentadiene, equilidene norbornene, 1,4-hexadiene and the like. The EPM is an ethylene-propylene copolymer.

A preferred particle size of the mineral powder 52 is in the range of 1 to 3 $\mu$m. A mineral powder 52 under 1 $\mu$m in particle size is hardly commercially available, thereby resulting in higher costs. On the other hand, a mineral powder 52 over 3 $\mu$m in particle size has a smaller thermal expansion coefficient, thereby leading to a reduced effect of preventing the creep.

A preferred particle size of the elastomer powder 53 is in the range of 0.1 to 1 $\mu$m. An elastomer powder 53 under 0.1 $\mu$m in particle size is hardly commercially available, thereby resulting in higher costs. An elastomer powder 53 over 1 $\mu$m in particle size presents a poor dispersibility and may spoil both the strength and the precision of molding.

A preferred mixing rate of the mineral powder 52 is 5 to 15 wt % (weight percentage), and a preferred mixing rate of the elastomer powder is 10 to 20 wt %. A most preferred mixing rate of both the powders combined is about 25 wt %.

If a content of the mineral powder 52 is under 5 wt %, the addition thereof does not provide a sufficient effect, whereas if a content thereof exceeds 15 wt %, the resultant resin material has a decreased thermal expansion coefficient, resulting in a reduced effect of preventing the creep.

Table 3 shows the results of comparison of the properties among resins containing different amounts of mineral powder 52 etc.

TABLE 3

| | Resin types | | | |
|---|---|---|---|---|
| Properties | PA11 (100%) | PA66 (60%) Mineral (40%) | PA66 (80%) Mineral (20%) | PA66 (75%) Mineral (10%) Elastomer (15%) |
| Mean roundness [$\mu$m] | 11.0 | 9.7 | 12.3 | 11.3 |
| Thermal expansion coefficient [$10^{-5}$/° C.] | 15 | 5 | 6 | 15 |
| Tensile strength [Mpa] | 56 | 100* | 89* | 58 |

Note: The resins with the asterisk "*" contain a mineral powder having a particle size of 5 $\mu$m, and the resins without the asterisk "*" contain a mineral powder having a particle size of 1 to 3 $\mu$m.

If a content of the elastomer powder 53 is under 10 wt %, the addition thereof does not provide a sufficient effect. On the other hand, if a content thereof exceeds 20 wt %, the resultant resin material is reduced in the roundness and the tensile strength. Table 4 shows the results of comparison of the properties among resins containing different amounts of elastomer powder 53.

TABLE 4

| | Resin types | | |
|---|---|---|---|
| Properties | PA11 (100%) | PA66 (80%) Elastomer (20%) | PA66 (70%) Elastomer (30%) |
| Mean roundness [$\mu$m] | 11.0 | 15.3 | 23.0 |
| Thermal expansion coefficient [$10^{-5}$/° C.] | 15 | 19 | 21 |
| Tensile strength [Mpa] | 56 | 52 | 43 |

Taking the above into consideration, measurement was taken on the properties of a preferred example of the resin coat piece 5. The results are shown in Table 5.

The resin coat piece 5 of this example is composed of a powder-like calcium carbonate, as the mineral powder 52, having a particle size of 1 to 3 μm and a powder-like modified EPDM, as the elastomer powder 53, having a particle size of 0.1 to 1 μm. The coat resin piece 5 is composed of 75 wt % of the base material 51, 10 wt % of the mineral powder 52 and 15 wt % of the elastomer powder 53.

From Table 5 and Table 1 illustrating the prior art, it should be appreciated that the aforementioned resin coat piece 5 is improved in the drawback of water absorption which is attributable to polyamide 66 used as the base material 51. Additionally, the thermal expansion coefficient of resin coat piece 5 is increased to the same level with that of PA11.

TABLE 5

| Properties | Embodiment |
| --- | --- |
| Specific gravity | 1.18 |
| Water absorption [%] | 6.2 |
| Tensile strength [Mpa] | 58 |
| Flexural strength [Mpa] | 78 |
| Fusion point [° C.] | 260 |
| Thermal deformation temperature [° C.] at load of 0.46 Mpa | 218 |
| Thermal expansion coefficient [$10^{-5}$/° C.] | 15 |
| Cost ratio (based on PA66 as 1) | 1.3 |

The rolling bearing 11 as shown in FIG. 1 with the resin coat piece 5 having the compositions based on the above measurements of the properties were examined for the creep torque during use and the dimensional change due to water absorption after being allowed to stand in a warehouse for a long term. The results are shown in FIG. 3 and FIG. 4. The resin coat piece 5 was made through injection molding process in each groove 2a of the outer ring 2 of the rolling bearing 11. In terms of the dimensional precision of the outside diameter, the resin coat piece 5 thus injection-molded presented such a small tolerance as 20 μm.

In FIG. 3, a rolling bearing of comparative sample 1 includes the resin coat piece 5 formed of PA11, and its outside face is finished by another process after molding. A rolling bearing of comparative sample 2 has no resin coat piece 5. The bearings used in this examination are commercially available as "SUJ2 Bearing" with a bearing number of 6000 (outside diameter: ϕ26 mm), and the housing is formed of an aluminum alloy. Initial dimensions of the bearings in the embodiment (of the present invention) and comparative samples 1, 2 are shown in Table 6.

TABLE 6

| | Resin type | Outside diameter of resin coat piece [mm] | Inside diameter of housing [mm] |
| --- | --- | --- | --- |
| Embodiment | PA66 | ϕ25.998 | ϕ25.995 |
| Comparative sample 1 | PA11 | ϕ26.024 | ϕ26.000 |
| Comparative sample 2 | none | ϕ26.024 | ϕ26.000 |

Referring to the graph of FIG. 4, the resin coat pieces 5 of the embodiment and the comparative sample 1 were each provided with a marking at a predetermined position so that the changes in the outside diameter thereof at the marked position were traced. The bearings with a bearing number of 6202 (outside diameter: ϕ35 mm) were used in this examination.

As is apparent from FIG. 3, the bearing of the embodiment is increased in the creep torque to a level much higher than that of the comparative sample 2, or comparing favorably with that of the comparative sample 1. The bearing of the embodiment maintains the creep torque above a required level at temperatures up to 180° C. Further, as shown in FIG. 4, the resin coat piece of the embodiment presents smaller dimensional changes due to water absorption than that of the comparative sample 1 throughout the period of use, although such changes fluctuate greatly during a period which corresponds to the rainy season.

According to the evaluation based on the above results, the resin coat piece 5 of this embodiment satisfies the required standards for all the evaluation items, as shown in Table 7.

TABLE 7

| Evaluation item | Embodiment |
| --- | --- |
| Creep torque | ◯ |
| Heat resistance | ◯ |
| Dimensional stability | ◯ |
| Cost | ◯ |

It is thus clarified that the aforementioned resin coat piece 5 according to the preferred embodiment is capable of withstanding continuous use for a long term under high temperature conditions, providing a stable effect of preventing the creep.

While a preferred embodiment of the invention has been described in detail, it is to be distinctly appreciated that the invention is not limited thereto but modifications will occur to those skilled in the art without departing from the spirit of the invention. Examples of such modifications will be given as below:

1) The resin coat piece 5 may be provided at two or more places in the outer peripheral surface of the outer ring 2 as spaced from one another in the axial direction. Additionally, the resin coat piece 5 may be disposed on a flat outer peripheral surface of the outer ring 2, rather than in the peripheral groove 2a. Instead of bonding to the outer ring 2 by the injection molding, the resin coat piece 5 may be bonded thereto by means of an adhesive.

2) Instead of the outer ring 2, the resin coat piece 5 may be disposed in the inner ring 1 at a fitting surface with the shaft 13, or at the inner peripheral surface thereof.

3) The resin coat piece 5 is applicable not only to the rolling bearings but also to the slide bearings.

What is claimed is:

1. A resin coat piece for bearing provided in a bearing at a fitting surface with a member to be fitted such as a housing or a shaft, said resin coat piece comprising a mixture of only:

polyamide 66 as a base material; and mineral powder and elastomer powder which are dispersedly mixed in said base material.

2. A resin coat piece of claim 1, wherein said mineral powder is one of calcium carbonate and mica, and said elastomer powder is one of a modified EPDM obtained by grafting maleic anhydride onto an ethylene-propylene-diene terpolymer and an ethylene-propylene copolymer.

3. A resin coat piece of claim 1, wherein said mineral powder has a particle size of 1 to 3 μm, and said elastomer powder has a particle size of 0.1 to 1 μm.

4. A resin coat piece of claim 1, wherein said mineral powder is one of calcium carbonate and mica each having a particle size of 1 to 3 μm, and said elastomer powder is one of a modified EPDM obtained by grafting maleic anhydride onto an ethylene-propylene-diene terpolymer and an ethylene-propylene copolymer each having a particle size of 0.1 to 1 μm.

5. A resin coat piece of any one of claim 1, wherein a mixing rate of said mineral powder is 5 to 15 wt %, and a mixing rate of said elastomer powder is 10 to 20 wt %.

6. A resin coat piece for bearing provided in a bearing at a fitting surface with a member to be fitted such as a housing or a shaft, said resin coat piece comprising:

polyamide 66 as a base material;

mineral powder in an amount of 5 to 15 wt % dispersedly mixed in said base material, said mineral powder having a particle size of 1 to 3 μm; and elastomer powder in an amount of 10 to 20 wt % dispersedly mixed in said base material, said elastomer powder having a particle size of 0.1 to 1 μm.

7. A resin coat piece on a bearing component provided in a bearing at a fitting surface with a member to be fitted such as a housing or a shaft for preventing bearing creep, said resin coat piece comprising a mixture in which the operative components are:

polyamide 66 as a base material; and mineral powder and elastomer powder which are dispersedly mixed in said base material.

* * * * *